United States Patent

[11] 3,557,983

| [72] | Inventors | Robert R. Hayes<br>Euclid;<br>Barry L. Laidman, Cleveland, Ohio |
|---|---|---|
| [21] | Appl. No. | 712,904 |
| [22] | Filed | Mar. 14, 1968 |
| [45] | Patented | Jan. 26, 1971 |
| [73] | Assignee | The Dow Chemical Company<br>Midland, Mich.<br>a corporation of Delaware |

[54] JOINING OF LAMINATES
8 Claims, 1 Drawing Fig.

[52] U.S. Cl...................................................... 29/470.1,
29/470.9, 29/471.1, 29/472.3, 29/497.5
[51] Int. Cl........................................................ B23k 21/00
[50] Field of Search............................................ 29/470.1,
470.9, 471.1, 472.3, 472.5, 497.5, 472.9, 488

[56] References Cited
UNITED STATES PATENTS

| 2,763,057 | 9/1956 | Clair, Jr........................ | 29/470.1 |
| 2,977,672 | 4/1961 | Telfar............................ | 29/497.5 |
| 3,115,987 | 12/1963 | Barnstead..................... | 29/488X |
| 3,156,514 | 11/1964 | Wing et al..................... | 29/498UX |
| 3,218,214 | 11/1965 | Polley........................... | 29/488UX |
| 3,252,203 | 5/1966 | Alberts et al. ................ | 29/497.5X |
| 3,353,263 | 11/1967 | Helms .......................... | 29/471.1X |
| 3,364,563 | 1/1968 | Seiwart......................... | 29/475X |
| 3,468,731 | 9/1969 | Obeda.......................... | 29/470.1X |

*Primary Examiner*—John F. Campbell
*Assistant Examiner*—Richard Bernard Lazarus
*Attorneys*—Griswold and Burdick, Richard G. Waterman and Robert B. Ingraham

ABSTRACT: Thermoplastic-coated metal foils are joined to provide electrical continuity by pressing under high pressure between flat surfaces.

PATENTED JAN 26 1971  3,557,983
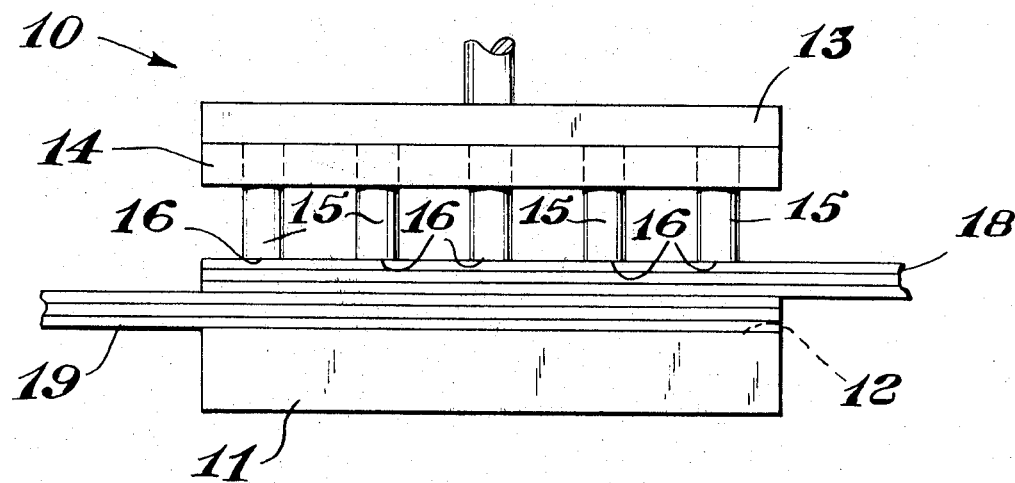
INVENTORS.
Robert R. Hayes
BY Barry L. Laidman
Robert B. Ingraham
AGENT

JOINING OF LAMINATES

This invention relates to a method for the bonding or joining of laminates, and more particularly relates to a method of bonding metal foils which have a coating of a synthetic resinous thermoplastic material on at least one surface thereof.

Laminates of metal foil and synthetic resinous thermoplastics find application in many areas. One particular area of utility is in the electrical field where such laminates are employed in the preparation of cables, electrical conductors and the like. Such a laminate is beneficially utilized in may many instances as a shield about one or more electrical conductors and a synthetic resinous jacket placed about the foil-enclosed conductors. In the manufacture of such cables, it is desirable to employ rolls or coils of a considerable length of a foil laminate and to feed the laminate to cable-making apparatus in a continuous manner. Periodically, it is necessary to join such foil laminates and provide electrical continuity therebetween. A known method of joining is to scrape or otherwise remove the synthetic resinous layer from one or both sides of the sheet, depending on whether the laminate is coated on one or both sides, weld the foil together and recoat the weld. Such a procedure is relatively difficult in that oftentimes the foils are thin and relatively fragile, while the thermoplastic material is often adherent and tough. Each joint made in such a manner can become a time-consuming and laborious project.

It would be desirable if there were available an improved method for joining metallic foils coated with synthetic resinous materials.

It would also be desirable if there were available an improved method for joining laminates of metallic foil and synthetic resinous material which was rapid and relatively inexpensive.

It would further be desirable if there were an improved method for joining synthetic resinous foils which did not require the removal of the synthetic resinous material.

It would also be desirable if such a method would provide electrical continuity between portions of the foil so joined.

These benefits and other advantages in accordance with the method of the present invention are achieved by providing a first laminate comprising at least a first layer of a metallic foil and a second layer of synthetic resinous thermoplastic material, placing portions of the first and second laminates in face to face adjacent relationship wherein the metal layers of the first and second laminates are separated by at least one layer of synthetic resinous me material, clamping at least a portion of the adjacent first and second laminates between a pair of generally planar parallel opposed surfaces and forcing the surfaces toward each other with a force sufficient to cause synthetic resinous thermoplastic material to flow from between the opposed clamping surfaces or faces and sufficient to bond the metal layers of the first and second laminates together.

A wide variety of materials may be used in the practice of the present invention. Metals which may be used to form the metal layers of the laminate are aluminum, copper, nickel, iron, silver and the like. The essential characteristic of the metal foil is that it be ductile and capable of cold welding under pressure.

Synthetic resinous thermoplastic materials which can be m employed in the method of the present invention include those which exhibit the property of cold flow under pressure at the temperature of welding. Particularly beneficial are materials such as polyethylene, ethylene-acrylic acid copolymers containing up to about 30 weight percent acrylic acid, ethylene-vinyl acetate polymers, polyvinyl chloride, nylon 6, nylon 66, nylon 7, vinylidene chloride polymers such as a polymer of 85 weight percent vinylidene chloride and 15 weight percent vinyl acetate, and the like.

It is essential and critical to the practice of the present invention that sheets being joined be pressed between flat generally parallel surfaces, and advantageously between a plurality of relatively small flat surfaces under pressures of at least 100,000 pounds per square inch, and beneficially up to about 200,000 pounds per square inch.

The FIGURE schematically depicts a fractional view of an apparatus suitable for the practice of the invention. The apparatus is generally designated by the reference numeral 10. The apparatus 10 has a lower press platen 11 having a major work engaging face 12; an upper platen 13 having disposed thereon a block 14 is generally adjacent the face 12 of the platen 11. A plurality of pins 15 are slidably disposed within the block 14. Adjacent the face 12 each of the pins 15 terminates in a clamping face 16, the faces being generally parallel to the face 12. A first laminate 18 is disposed adjacent the pins 15 and a second laminate 19 is disposed adjacent the face 12. Each of the laminates 18 and 19 consist of external plastic layers and an inner layer of a cold weldable metal.

Generally it is desirable to employ one large clamping face such as the face 12 and a plurality of smaller clamping faces such as the faces 16 if a relatively wide strip of material is to be joined. Beneficially, a plurality of small clamping faces are provided by assembling a plurality of projecting pins such as the pins 15 within a support such as the block or plate 14 having openings within which the pins are sliding fit. The pins are arranged with their longitudinal axes disposed normal to the major clamping face. The projecting pins are arranged in a desired predetermined pattern and in one or more rows wherein the pins are spaced apart and extend over an area generally commensurate with the area of the desired weld or joint. The clamping surfaces of the pins are flat and are positioned parallel to the opposed major clamping face. The edge of the minor clamping face should terminate abruptly; that is, have a sharp or nonchamfered 1 such as is obtained by grinding a flat face on the end of a cylindrical dowel pin. Chamfering or rounding off the edges is undesirable and results in poor or weak bonds. Advantageously, the major clamping faces are formed of hardened tool steel, silicon-manganese steel or other materials which will withstand loading to 100,000 to 200,000 pounds per square inch without deformation. Similarly, the minor clamping members or pins should be of a hard material which does not tend to deform under the required compression load. Cemented tungsten carbide is an eminently suitable material from which to prepare such pins.

When joining laminates in accordance with the method of the invention, it is essential and critical that the pressure be applied relatively slowly; that is, the minor clamping face or faces should develop maximum pressure over a period of time in excess of about 0.1 second, and beneficially over a period of about 1 second. Impact of the pins or minor clamping faces against the laminate does not provide desired metal to metal bond. The thermoplastic material apparently may be squeezed from between the metal faces but not driven therefrom by a sharp blow. Longer periods of time than 1 second may be employed for thin laminates; that is, laminates where the layer thickness is on the order of a few mils. However, no significant gain in properties is achieved when the pressure is applied over a period of many seconds or minutes. It is desirable to space the minor clamping faces a distance about equal to the minor dimension of the clamping face or to the diameter if the minor clamping face has a circular configuration. Displacement of the resinous material on welding causes minor distortion of the sheet which is readily flattened by the application of sufficient pressure to overcome dimpling which tends to appear after joining. Advantageously, the distortion of the sheet is somewhat less if spacing between clamping faces is increased. The precise number and arrangement of minor clamping faces will depend primarily upon the nature of joint desired, the degree of distortion which can be tolerated and the electrical conductivity desired in the joint. Joining of the laminates may be carried out at any desired temperature between the decomposition point of the particular synthetic resinous material used and the temperature below which the resinous material ceases to flow under the applied pressure. For most applications, ambient temperature; that is, in the range from about 20 to 30° C., is eminently satisfactory. Most thermoplastic resinous materials readily withstand temperatures up to about 150° C.

By way of further illustration, a laminate is prepared which consists of a 4 mil thick soft aluminum foil having surface layers 2 mils in thickness of a polymer of 88 weight percent ethylene and 12 weight percent acrylic acid. A plurality of one-eighth inch diameter tungsten carbide pins, three-eighths inch in length in 6 parallel rows, the pins being spaced on about five-sixteenth inch centers, are positioned in a plate having a thickness of about five-sixteenth inch. The tungsten carbide pins have ends ground square to form minor clamping faces and are positioned adjacent a hardened steel backup plate which acts as a major clamping face. The overlapped laminate is placed over the protruding pins and the backup plate brought into contact with the laminate. A hydraulic press is used to force the pins against the laminate and backing plate with a force of about 185,000 pounds per square inch. The pressure is built up over a period of about 1 second. The pressure is then released and the laminate removed from the apparatus. An excellent electrically conductive metal to metal bond in obtained. Similar results are achieved employing pressures on the minor clamping faces from about 100,000 to 200,000 pounds per square inch.

In a manner similar to the foregoing illustration, other synthetic resinous thermoplastic-metallic laminates are readily joined including aluminum-polypropylene, copper-polyethylene, nickel-polyvinyl chloride, silver-nylon 66 and the like. As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being a rest restrictive or otherwise limiting of the present invention, excepting as it is set forth and defined in the hereto-appended claims.

We claim:

1. A method for joining laminates of metal and synthetic thermoplastic resins by cold welding under pressure to provide an electrically conductive joint, the steps of the method comprising:
   providing a first laminate, the first laminate comprising at least a first layer of a metallic foil and a second layer of synthetic resinous thermoplastic material, a second laminate comprising at least a first layer of a metallic foil and a second layer of a synthetic resinous thermos thermoplastic material;
   placing portions of the first and second laminates in face to face adjacent relationship wherein the metal layers of the surfaces; and second laminates are separated by at least one layer of synthetic resinous material;
   clamping at least a portion of the adjacent first and second laminates between a pair of generally planar parallel opposed surfaces, and
   forcing the surfaces toward each other with a force sufficient to cause synthetic resinous thermoplastic material to flow from between the opposed surfaces and sufficient to bond the metal layers of the first and second laminates together, with the further limitation that the laminate is maintained at a temperature below the decomposition temperature of the resin.

2. The method of claim 1 wherein the opposed clamping surfaces comprise a first major clamping surface and a plurality of second minor clamping surfaces.

3. The method of claim 1 wherein the clamping surfaces are forced together under a pressure of from about 100,000 to 200,000 pounds per square inch.

4. The method of of claim 2 wherein the minor clamping surfaces are defined by a plurality of pins.

5. The method of claim 1 wherein the metal foil of the first and second laminates is aluminum.

6. The method of claim 5 wherein the synthetic resinous material is an ethylene polymer.

7. The method of claim 1 including the step of subsequently flattening the laminates in a region wherein the metal layers are bonded.

8. The method of claim 1 wherein the first and second laminates each have a third layer of synthetic resinous material, the second and third resinous layers being separated by the first layer.

PO-1050
(5/69)

UNITED STATES PATENT OFFICE
CERTIFICATE OF CORRECTION

Patent No. 3,557,983            Dated 26 January 1971

Inventor(s) Robert R. Hayes

It is certified that error appears in the above-identified patent and that said Letters Patent are hereby corrected as shown below:

In column 1, line 11, delete "may"; in line 45 insert the following between "al," and "placing":

-- a second laminate comprising at least a first layer of a metallic foil and a second layer of a synthetic resinous thermoplastic material, --;

in line 48, delete "me"; in line 62 delete "m".

In column 2, line 23, insert -- a -- between "are" and "sliding"; in line 32 change "l" to -- edge --.

In column 3, line 21, change "in" to -- is --; in line 34 delete "a"; in line 35 delete "rest".

In column 4, line 6, delete "thermos"; line 10, change "surfaces" to -- first --; Claim 4, line 28, delete one "of".

Signed and sealed this 8th day of June 1971.

(SEAL)
Attest:

EDWARD M. FLETCHER, JR.
Attesting Officer

WILLIAM E. SCHUYLER, JR.
Commissioner of Patents